(12) United States Patent
Cercone

(10) Patent No.: US 10,240,708 B2
(45) Date of Patent: Mar. 26, 2019

(54) SYSTEM FOR APPLYING A WEB AROUND A CYLINDRICAL OBJECT WITH EVEN TENSION

(71) Applicant: Milliken Infrastructure Solutions, LLC, Spartanburg, SC (US)

(72) Inventor: Lawrence Cercone, Littleton, CO (US)

(73) Assignee: Milliken & Company, Spartanburg, SC (US)

( * ) Notice: Subject to any disclaimer, the term of this patent is extended or adjusted under 35 U.S.C. 154(b) by 301 days.

(21) Appl. No.: 15/428,221

(22) Filed: Feb. 9, 2017

(65) Prior Publication Data

US 2018/0224047 A1    Aug. 9, 2018

(51) Int. Cl.
     *B65H 27/00*      (2006.01)
     *F16L 55/18*      (2006.01)

(52) U.S. Cl.
     CPC .............. *F16L 55/18* (2013.01); *B65H 27/00* (2013.01); *B65H 2402/61* (2013.01); *B65H 2402/63* (2013.01); *B65H 2404/117* (2013.01); *B65H 2404/135* (2013.01); *B65H 2407/21* (2013.01)

(58) Field of Classification Search
     CPC ..... F16L 55/18; B65H 27/00; B65H 2407/21; B65H 2404/135; B65H 2402/63; B65H 2402/61; B65H 2404/117
See application file for complete search history.

(56) References Cited

U.S. PATENT DOCUMENTS

| | | | | |
|---|---|---|---|---|
| 384,726 | A * | 6/1888 | Smith .................... | A47K 10/22 242/599.3 |
| 3,337,145 | A * | 8/1967 | Keck ...................... | B65H 54/22 242/129.51 |
| 3,561,698 | A * | 2/1971 | Steffenini .............. | B65H 75/18 242/118.31 |
| 3,863,859 | A * | 2/1975 | Keith ..................... | B65H 49/32 242/389 |
| 4,369,934 | A | 1/1983 | Spies ......................... | 242/157.1 |
| 5,244,138 | A * | 9/1993 | Blanding ............... | B65H 27/00 226/15 |
| 5,509,696 | A | 4/1996 | Smith et al. .................... | 285/27 |
| 6,024,135 | A | 2/2000 | Nobileau ...................... | 138/134 |
| 6,065,716 | A * | 5/2000 | Munster ................. | B65H 75/18 242/597.6 |
| 8,567,448 | B2 | 10/2013 | Stringfellow et al. ......... | 138/98 |
| 8,567,450 | B2 | 10/2013 | Stringfellow et al. ......... | 138/98 |
| 9,057,473 | B2 | 6/2015 | Souza ............................ | 138/97 |

(Continued)

*Primary Examiner* — William A. Rivera
(74) *Attorney, Agent, or Firm* — Cheryl J. Brickey

(57) ABSTRACT

A system for applying a web around a cylindrical object with even tension containing a core having a generally cylindrical shape and a pair of handles. The wall of the cylindrical object contains a plurality of ribs spaced around the circumference, where each rib connects the inner diameter and the outer diameter and extends from the first end to the second end defining honeycomb areas within the wall. Each handle has a insertion area, a collar area, a gripping area, and at least 2 locating pins. The collar area is sandwiched between the insertion area and the gripping area and the insertion diameter is less than the inner diameter of the core at the first end and second end. The location pins extend from the collar area and are located such that the pins fit into the honeycomb areas within the wall of the core.

21 Claims, 2 Drawing Sheets

(56) References Cited

U.S. PATENT DOCUMENTS

2009/0218435 A1* 9/2009 Morgan ................. B65H 75/10
                                                        242/599.4
2014/0182733 A1* 7/2014 Mettee, II ........... B29C 47/0028
                                                        138/111

* cited by examiner

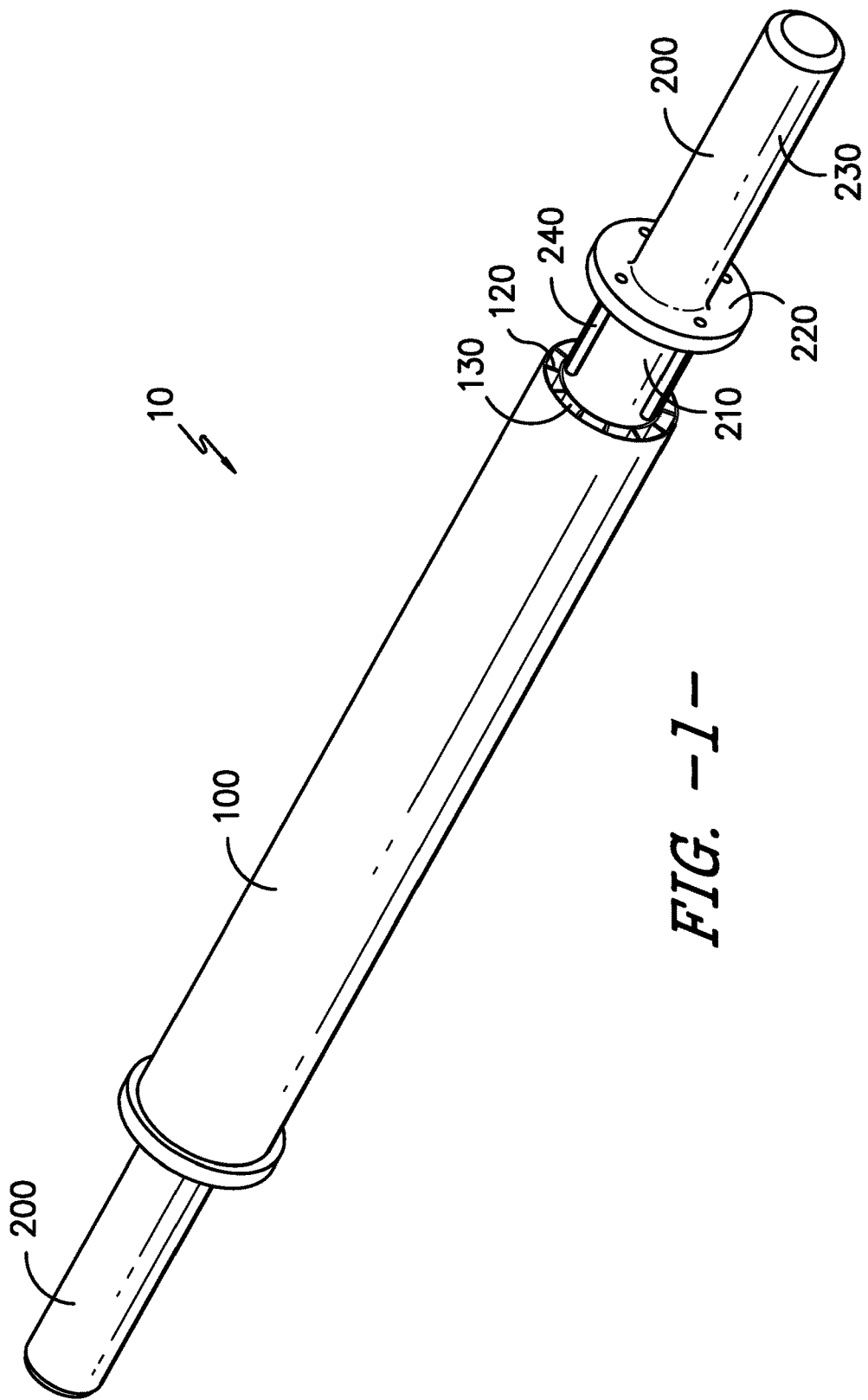
FIG. -1-

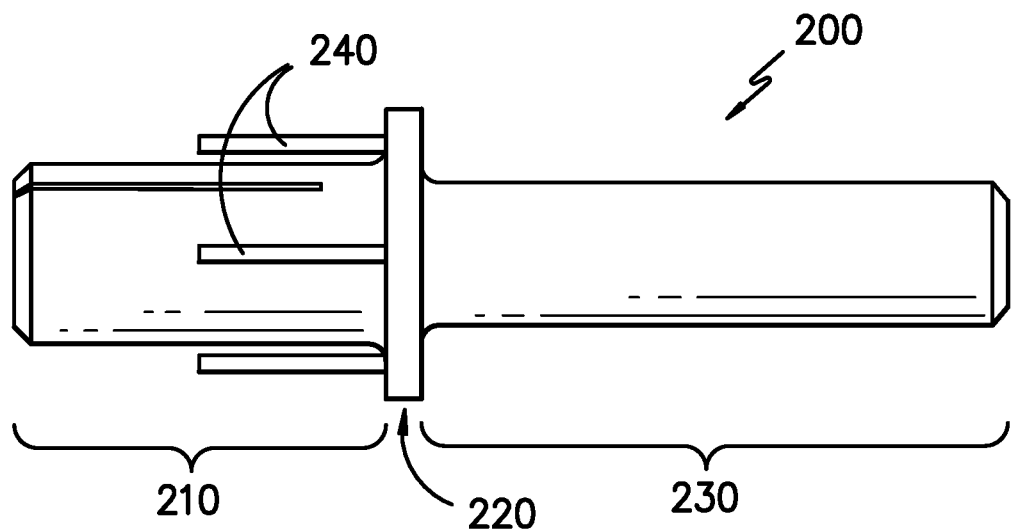
FIG. -2-
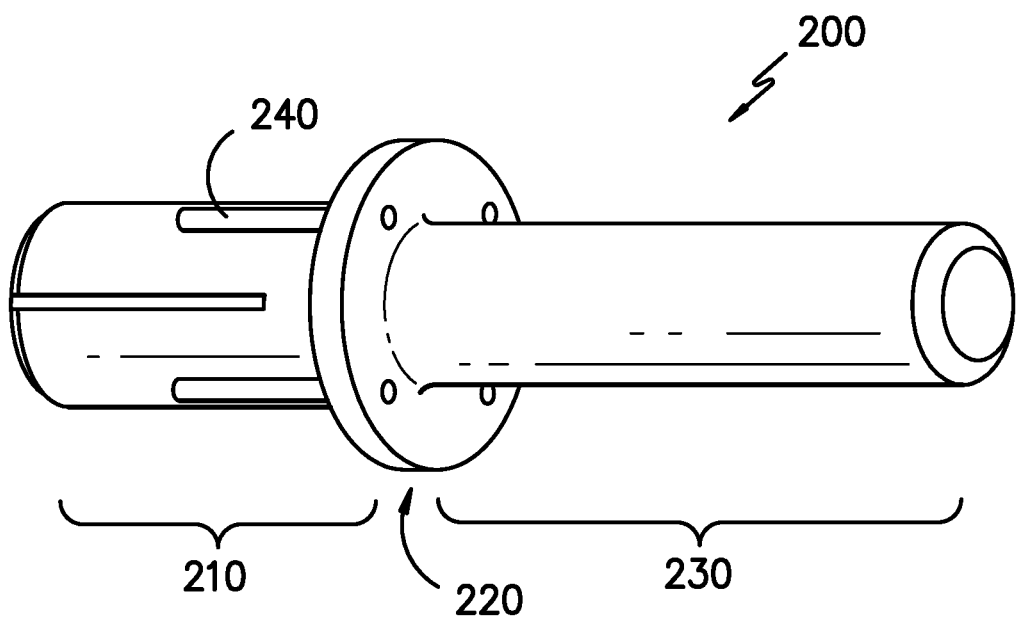
FIG. -3-

SYSTEM FOR APPLYING A WEB AROUND A CYLINDRICAL OBJECT WITH EVEN TENSION

TECHNICAL FIELD OF THE INVENTION

The invention provides a system and method for applying a web around a cylindrical object with even tension.

BACKGROUND

Pipes (and other cylindrical objects such as conduits and the like) are used to transport materials (solids, liquids, and gases) across distances. Over time, the pipes and conduits may have defects form which must be fixed. These defects are defined to be anything that impacts the structural integrity of the cylindrical object or that is or has the possibility of leaking. Such pipes themselves may be deployed in environments that also subject the exterior of the pipe to corrosive or otherwise physically or chemically damaging conditions. Where cylindrical objects are joined together could be considered a defect for the possibility of leaking. Pipes may exhibit mechanical damage, including the growth of micro-cracks that can be induced from crimp connections. Of course, this is undesirable where such defects could allow for leaking, posing dangers to individuals or the environment.

When applying rolled goods in the form of webs to the circumference of a pipe, it is difficult to control the "lay down" since the webs tend to bag in the center and have therefore have uneven tension.

There is a need for a system to enable an installer to eliminate or reduce the bagging of the web be able to control the tension of the web as it is wrapped around the pipe circumference.

BRIEF SUMMARY OF THE INVENTION

A system for applying a web around a cylindrical object with even tension containing a core having a generally cylindrical shape and a pair of handles. The wall of the cylindrical object contains a plurality of ribs spaced around the circumference, where each rib connects the inner diameter and the outer diameter and extends from the first end to the second end defining honeycomb areas within the wall. Each handle has an insertion area, a collar area, a gripping area, and at least 2 locating pins. The collar area is sandwiched between the insertion area and the gripping area and the insertion diameter is less than the inner diameter of the core at the first end and second end. The location pins extend from the collar area and are located such that the pins fit into the honeycomb areas within the wall of the core.

BRIEF DESCRIPTION OF THE FIGURES

An embodiment of the present invention will now be described by way of example, with reference to the accompanying drawings.

FIG. 1 illustrates schematically one embodiment of the system.

FIGS. 2-3 illustrates schematically embodiments of the handle.

DETAILED DESCRIPTION OF THE INVENTION

Referring to FIG. 1, there is shown one embodiment of the system for applying a web around a cylindrical object with even tension 10. The system 10 contains a core 100 and a pair of handles 200.

The core 100 has a generally cylindrical shape with a circumference, a length, a wall, an inner diameter, and an outer diameter. The wall has a thickness defined to be the distance between the inner diameter and the outer diameter. The core also has a first end a second end. The wall of the core has a honeycomb like structure with a plurality of ribs 120 extending from the inner diameter to the outer diameter and extending from the first end to the second end. The ribs 120 are preferably equally spaced about the circumference of the core. The areas within the wall that are open (between the ribs 120) are called the honeycomb areas 130. Both the ribs 120 and the honeycomb areas 130 are preferably continuous from the first end to the second end of the core.

Preferably, the wall of the core 100 has a thickness of between about 0.2 and 1 inch, more preferably between about 0.25 and 0.7 inch. The core may have any suitable number of ribs 120 around the circumference of the core 100. In one embodiment, the core contains at least 4 ribs and in another embodiment the core contains at least 8 ribs. Preferably, the ribs are evenly spaced around the circumference of the core.

The core may be made of any suitable material depending on the material to be placed on it. It may be cellulose (such as a cardboard), plastic, or metal.

The system 10 further comprises a pair of handles 200. Alternative views of the handles can be seen in FIGS. 2 and 3. The handles 200 contain 4 main parts; an insertion area 210, a collar area 220, a gripping area 230, and at least 2 locating pins 240. The insertion area 220 of the handles 200 have a generally cylindrical shape with a insertion diameter less than the inner diameter of the core 100 at the first end and second end such that the insertion area 210 of the handle 200 extends into the core 100. When the handles 200 are inserted into the core 100, the handles 200 are inserted the approximate length of the insertion area 210. The insertion area 210 preferably has a length of between about 1 and 4 inches and will depend on the length of the core 100.

In one embodiment, the insertion area is tapered. In this embodiment, the insertion diameter is largest at the end of the insertion area closest to the collar area and smallest at the end of the insertion area farthest from the collar area. It has been found that a taper sometimes helps fit into cores more easily.

The collar area 220 is sandwiched between the insertion area 210 and the gripping area 230 and has a generally cylindrical shape with a collar diameter that is larger than the inner diameter of the core at the first end and second end. In some embodiments, the collar area 220 prevents the handle 200 from being inserted too far into the core 100. The collar 220 is also where the locating pins 240 are located and will typically have a length of between about 0.5 and 1.5 inches, more preferably between about 0.125 and 0.5 inches.

The gripping area is where the installer would hold the handles 200 (and therefore the system 10). The gripping area has a generally cylindrical shape with a gripping diameter that is a comfortable for hand hold. The gripping area may have additional features to prevent slippage such as a roughened surface area, taper, or coating. The gripping area 230 of the handles 200 is typically between about 3 and 7 inches in length, a comfortable length for an operator's hand to grip onto.

The handle 200 also contains at least 2 locating pins. The locating pins have a locating pin length and are attached to the collar area and extend towards the insertion area. The pins 240 fit into the honeycomb areas 130 within the wall of the core 100 and serve to prevent the core 100 from spinning independent of the handles 200. The pins 240 are located in the handle 200 so that they match up and fit into the honeycomb areas 130 within the wall of the core 100. In a more preferred embodiment, the handles 200 each contain at least 4 pins, more preferably at least about 8 pins. The pins typically have a length of between about 0.5 inches and 5 inches, more preferably between about 1 and 2 inches and have a diameter of about 0.125".

The handle 200 may be formed in any suitable manner. Any combination of the parts 210, 220, 230, 240 may be made separately and then are assembled together or may be formed together. In one embodiment, the insertion area, collar area, and gripping area are formed from a single unitary piece of material and then the locating pins are added to the handles. In another embodiment, the insertion area, collar area, gripping area, and locating pins are formed from a single unitary piece of material. The handles may be made out of any suitable material, such as a metal or plastic. The handles may be made by, for example, machining them out of the block of material, molding them into shape, and 3D printing them. The handles may be any suitable material that allows for the desired end use. In one embodiment, the handles comprise metal. In another embodiment, the handles comprise a polymer. In another embodiment, the handles comprise both metal and a polymer.

In one embodiment, the handles 200 are formed such that the gripping area 230 can be rotated independently from the collar are 220, insertion area 210, and locating pins 210. This may be preferred in some embodiments for the ease of wrapping a pipe or other cylindrical object.

The core may have any suitable length, but the smaller the length of the core, the less of an issue the applying a web around a cylindrical object with even tension is. Preferably, the core has a length of at least about 6 inches, more preferably at least about 10 inches. In another embodiment, the core has a length of between about 4 and 24 inches, more preferably between about 6 and 18 inches.

A web is wrapped around the core. The web may be any suitable elongated, flat material such as a plastic film or fabric. In one embodiment, the web is used to reinforce or fix a cylindrical object such as a pipe or conduit. Preferably, the web is a fabric web which is saturated with a curable polymer material. The system has the added benefit of providing handles to reduce the amount of curable polymer that gets on the hands of the installer. Once the web is wrapped around the cylindrical object, the curable polymer material is cured (using ambient conditions or added heat, UV, or other energy). This wrapping can serve as a fix for a defect in the surface of the cylindrical object or as a reinforcement for the cylindrical object or in a connection between two or more cylindrical objects.

Preferably, the web is a woven textile. The woven textile contains warp yarns in a first direction (along the length direction of the woven textile) and weft yarns which are at approximately 90 degrees to the warp yarns. The mechanical properties of the web have been found to be improved having the warp and weft yarns at approximate right angles to each other.

The method of applying a web around a cylindrical object (such as a pipe, tank, conduit) with even tension begins by identifying a cylindrical object in need of reinforcement or fixing. The cylindrical object may be optionally cleaned so that the web applied will have better adhesion. Additionally, the defect in the pipe may be filled with filling materials if applicable.

The system for applying the web is assembled. The system contains a core having a generally cylindrical shape with a circumference, a length, a wall, an inner diameter, an outer diameter, a first end, a second end. The wall comprises a plurality of ribs spaced around the circumference and each rib connects the inner diameter and the outer diameter and extends from the first end to the second end defining honeycomb areas within the wall. The core contains a web (preferably a fabric web) wrapped around the core, ready to be delivered onto the cylindrical object.

The system also contains a pair of handles, wherein each handle has a insertion area, a collar area, a gripping area, and at least 2 locating pins. The collar area is sandwiched between the insertion area and the gripping area. The insertion area of the handles have a generally cylindrical shape with an insertion diameter less than the inner diameter of the core at the first end and second end. The insertion area is connected to the collar area, the gripping area has a generally cylindrical shape with a gripping diameter, the gripping area is connected to the collar area, the locating pins have a locating pin length and are attached to the collar area and extend towards the insertion area, and the location of the pins in the collar area is such that the pins fit into the honeycomb areas within the wall of the core.

The handles are inserted the first and second end of the core such that a portion of the insertion pins are located within the honeycomb areas of the core. The operator holds the gripping area of the handles when applying the web to the cylindrical object.

The web is then wrapped around the cylindrical object (while simultaneously unwrapping from the core). The web is then optionally cured or had other processes applied to it to create a strengthening element for the cylindrical object.

In a conventional method, the person applying the web places their fingers into the core to act as a shaft. Their thumbs are then placed on the edges of the material as it is wrapped around the pipe (which also causes the thumbs (or gloves) to typically get dirty with the curable polymer). The pressure exerted by the thumbs causes tension to be placed on the edges while the center of the roll can "bag" or be loose causing wrinkles to appear on the reinforcing material. These wrinkles then need to be worked out by rubbing the surface.

In this invention, the handles when inserted into the core become a shaft. The person applying the reinforcing material can then put pressure on the handle portion (230) which then applies an even tension along the entire width of the material elimination "bag" or loose material in the center. In general, this method keeps the warp and weft fibers perpendicular (90°) to one another. By doing so, the material preforms at its maximum mechanical properties.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A system for applying a web around a cylindrical object with even tension comprising:
   a core having a generally cylindrical shape with a circumference, a length, a wall, an inner diameter, an outer diameter, a first end, a second end, wherein the wall comprises a plurality of ribs spaced around the circumference, wherein each rib connects the inner diameter and the outer diameter and extends from the first end to the second end defining honeycomb areas within the wall; and,
   a pair of handles, wherein each handle has a insertion area, a collar area, a gripping area, and at least 2 locating pins, wherein the collar area is sandwiched between the insertion area and the gripping area, wherein the insertion area of the handles have a generally cylindrical shape with a insertion diameter less than the inner diameter of the core at the first end and second end, wherein the insertion area is connected to the collar area, wherein the gripping area has a generally cylindrical shape with a gripping diameter, wherein the gripping area is connected to the collar area, wherein the locating pins have a locating pin length and are attached to the collar area and extend towards the insertion area, wherein the location of the pins in the collar area is such that the pins fit into the honeycomb areas within the wall of the core.

2. The system of claim 1, wherein the core has a length of at least about 6 inches.

3. The system of claim 1, wherein the core comprises at least 4 ribs.

4. The system of claim 1, wherein the core comprise at least 8 ribs.

5. The system of claim 1, wherein the ribs are evenly spaced around the circumference of the core.

6. The system of claim 1, wherein the ribs and the honeycomb areas of the core are continuous along the length of the core.

7. The system of claim 1, wherein the collar area of the handles have a generally circular cross-section and have a larger diameter than the insertion area of the handle and the inner diameter of the core.

8. The system of claim 1, wherein the handles comprise at least 4 pins.

9. The system of claim 1, wherein the insertion area, collar area, and gripping area are one unitary piece.

10. The system of claim 1, wherein the gripping area and the collar area are able to be rotated independent of the insertion area.

11. The system of claim 1, further comprising a web wound onto the core.

12. The system of claim 11, wherein the web comprises a fabric saturated with a curable polymer material.

13. The system of claim 1, wherein the cylindrical object is a pipe or conduit.

14. The system of claim 1, wherein the insertion area is tapered where the insertion diameter is largest at the end of the insertion area closest to the collar area and smallest at the end of the insertion area farthest from the collar area.

15. A method of applying a web around a cylindrical object with even tension comprising:
   obtaining a cylindrical object;
   obtaining a core having a generally cylindrical shape with a circumference, a length, a wall, an inner diameter, an outer diameter, a first end, a second end, wherein the wall comprises a plurality of ribs spaced around the circumference, wherein each rib connects the inner diameter and the outer diameter and extends from the first end to the second end defining honeycomb areas within the wall; and,
   wrapping a web around the core;
   obtaining a pair of handles, wherein each handle has a insertion area, a collar area, a gripping area, and at least 2 locating pins, wherein the collar area is sandwiched between the insertion area and the gripping area, wherein the insertion area of the handles have a generally cylindrical shape with a insertion diameter less than the inner diameter of the core at the first end and second end, wherein the insertion area is connected to the collar area, wherein the gripping area has a generally cylindrical shape with a gripping diameter, wherein the gripping area is connected to the collar area, wherein the locating pins have a locating pin length and are attached to the collar area and extend towards the insertion area, wherein the location of the pins in the collar area is such that the pins fit into the honeycomb areas within the wall of the core;
   inserting each handle into the core such that a portion of the insertion pins are located within the honeycomb areas of the core;
   wrapping the web around the cylindrical object.

16. The method of claim 15, wherein the ribs and the honeycomb areas of the core are continuous along the length of the core.

17. The method of claim 15, wherein the collar area of the handles have a generally circular cross-section and have a larger diameter than the insertion area of the handle and the inner diameter of the core.

18. The method of claim 15, wherein the handles comprise at least 4 pins.

19. The method of claim 15, wherein the cylindrical object is a pipe or conduit.

20. The method of claim 15, wherein the web is a woven textile comprising warp yarns in a first direction and weft yarns at approximately 90 degrees to the warp yarns.

21. The method of claim 15, wherein the insertion area is tapered where the insertion diameter is largest at the end of the insertion area closest to the collar area and smallest at the end of the insertion area farthest from the collar area.

\* \* \* \* \*